US010282538B2

(12) United States Patent
Otturu et al.

(10) Patent No.: US 10,282,538 B2
(45) Date of Patent: May 7, 2019

(54) TECHNOLOGIES FOR PROVIDING HARDWARE SUBSCRIPTION MODELS USING PRE-BOOT UPDATE MECHANISM

(71) Applicant: Intel Corporation, Santa Clara, CA (US)

(72) Inventors: Sudhakar Otturu, Portland, OR (US); Krishna Kumar Ganesan, Hillsboro, OR (US); Erik Holt, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,656

(22) Filed: Dec. 27, 2014

(65) Prior Publication Data
US 2016/0188868 A1 Jun. 30, 2016

(51) Int. Cl.
| | | |
|---|---|---|
| G06F 21/44 | (2013.01) | |
| G06F 21/57 | (2013.01) | |
| G06F 9/445 | (2018.01) | |
| H04L 12/24 | (2006.01) | |
| G06F 9/4401 | (2018.01) | |
| G06F 8/654 | (2018.01) | |

(52) U.S. Cl.
CPC ............ *G06F 21/44* (2013.01); *G06F 9/4416* (2013.01); *G06F 9/44505* (2013.01); *G06F 21/575* (2013.01); *H04L 41/0813* (2013.01); *G06F 8/654* (2018.02); *G06F 2221/2149* (2013.01)

(58) Field of Classification Search
CPC ....... G06F 9/4416; G06F 21/73; G06F 21/575

USPC ................................................... 713/189, 183
See application file for complete search history.

(56) References Cited

U.S. PATENT DOCUMENTS 8,533,801 B2    9/2013  Carpenter
2005/0251851 A1  11/2005  Patrick
(Continued)

FOREIGN PATENT DOCUMENTS

CN           101561915        10/2009

OTHER PUBLICATIONS

International Search Report for PCT/US15/061613, dated Mar. 2, 2016 (3 pages).
(Continued)

*Primary Examiner* — Lynn D Feild
*Assistant Examiner* — Dereena T Cattungal
(74) *Attorney, Agent, or Firm* — Barnes & Thornburg LLP

(57) ABSTRACT

Technologies to enable, disable and control hardware subscription features. Computing devices communicate over a network to a subscription server to provide hardware platform information for each of the computing devices. As the subscription server receives hardware platform information, the subscription server determines the hardware features that are enabled, and further determines what hardware subscription options are available for each of the computing devices. When a hardware subscription option is selected/purchased by a computing device, subscription server provides a pre-boot update mechanism, such as a Unified Extensible Firmware Interface (UEFI) capsule, to act as a boot level program that enables hardware features on the computing device. Hardware subscription features are also securely protected using cryptographic engine modules.

24 Claims, 7 Drawing Sheets

(56) References Cited

U.S. PATENT DOCUMENTS

| | | | |
|---|---|---|---|
| 2008/0080552 A1* | 4/2008 | Gates | H04L 12/66 370/468 |
| 2009/0239503 A1* | 9/2009 | Smeets | H04L 63/06 455/411 |
| 2009/0327684 A1 | 12/2009 | Zimmer | |
| 2009/0327741 A1* | 12/2009 | Zimmer | G06F 21/575 713/183 |
| 2010/0077066 A1* | 3/2010 | Chawla | G06F 9/4416 709/222 |
| 2010/0107241 A1* | 4/2010 | Jaber | G06F 21/31 726/18 |
| 2011/0138166 A1* | 6/2011 | Peszek | G06F 21/575 713/2 |
| 2012/0027199 A1* | 2/2012 | Haider | G06F 21/34 380/28 |
| 2012/0166781 A1 | 6/2012 | De Cesare | |
| 2012/0278606 A1 | 11/2012 | Huang | |
| 2014/0047443 A1* | 2/2014 | Mann | G06F 9/45533 718/1 |
| 2014/0250255 A1* | 9/2014 | Gordon | G06F 21/73 711/102 |
| 2014/0281504 A1 | 9/2014 | Dasari | |
| 2015/0268970 A1* | 9/2015 | Mudusuru | G06F 9/4411 713/1 |
| 2015/0363323 A1* | 12/2015 | Yu | G06F 8/65 711/133 |
| 2015/0370575 A1* | 12/2015 | Tonry | G06F 21/10 713/2 |
| 2016/0011879 A1* | 1/2016 | Wang | G06F 9/4401 713/1 |
| 2016/0134621 A1* | 5/2016 | Palanigounder | H04W 12/06 713/156 |

OTHER PUBLICATIONS

Written Opinion for PCT/US15/061613, dated Mar. 2, 2016 (7 pages).

Extended European Search Report for European Patent Application No. 15873936.7, dated Jul. 24, 2018, including prior art and translations of prior art (45 pages).

* cited by examiner

TECHNOLOGIES FOR PROVIDING HARDWARE SUBSCRIPTION MODELS USING PRE-BOOT UPDATE MECHANISM

BACKGROUND

Modern computing devices have become ubiquitous tools for personal, business, and social uses. As such, many modern computing devices are capable of connecting to various data networks, including the Internet and corporate intranets, to retrieve and receive data communications over such networks. Oftentimes, a computing device connected to one network communicates with a computing device connected on a different network. With the advent of such networking, the use of subscription software services have become more prevalent, where a customer executing software on a computing device must pay a subscription or access fee to continue to use the software or specific software features. While certain advancements have been made in the area of software subscription services, very little has been done to develop hardware-based subscription models and services.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
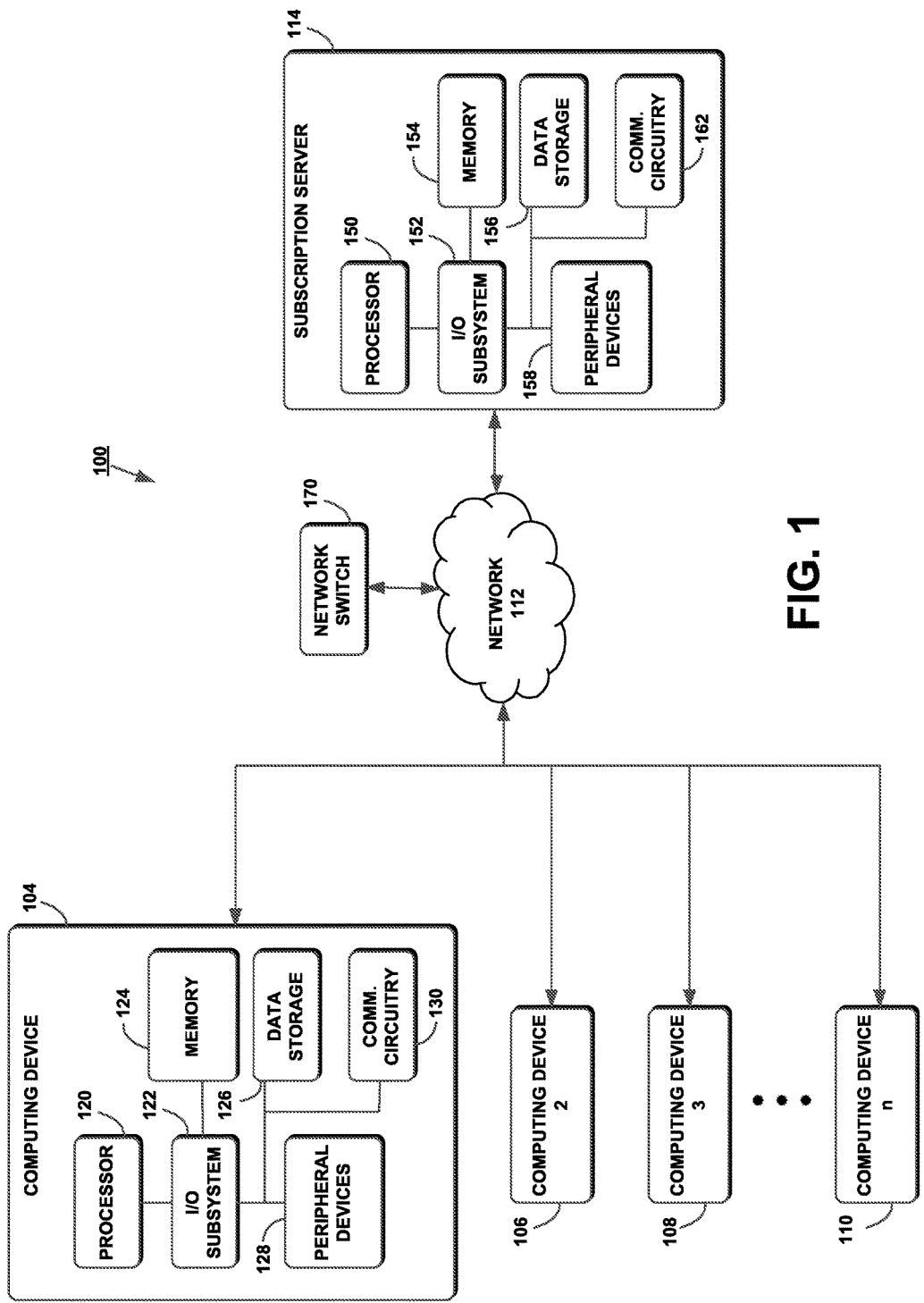
FIG. 1 illustrates a simplified block diagram of at least one embodiment of a system establishing and providing hardware subscription features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for establishing and providing hardware subscription features is shown. The illustrative system 100 includes a computing device 104, a subscription server 114, and a network switch 170, each of which may be capable of operating using packet-switched or other suitable communications. In use, the system 100 operates to provide hardware platform information from each of the computing devices 104-110 to the subscription server 114. As the subscription server 114 receives hardware platform information, the subscription server 114 determines the hardware features that are enabled, and further determines which hardware subscription options are available for each of the computing devices 104-110. When a hardware subscription option is selected/purchased by a computing device (e.g., 104), subscription server 114 provides a pre-boot update mechanism using a boot capsule, such as a Unified Extensible Firmware Interface (UEFI) capsule, to act as a boot level program that enables the selected/purchased hardware features on the computing device 104-110. The boot capsule serves as a hardware subscription authorization for computing devices 104-110.

The selectable/purchasable hardware features of the computing device 104-110 may be embodied as any aspect of hardware and/or hardware component that is capable of being modified, enabled or disabled from a boot level of a computing device. Examples of modifiable hardware features suitable for hardware subscription authorization may include the modification of a number of processor cores used during operation (e.g., single core, quad-core, etc.), or the modification of processor operating frequency (e.g. 2.4 Ghz/3.6 Ghz). Other modifiable hardware features may include cache size (4 MB/8 MB) or PCI Express Graphics (PEG) ports/lanes (e.g., ×8/×16). Examples of hardware features that may enabled or disabled completely may include gesture sensing for a gesture sensing apparatus, fingerprint sensing for a fingerprint sensing apparatus, and hardware interfaces allowing connections to external peripherals (e.g., Thunderbolt™). It can be appreciated by those skilled in the art that the enablement, disablement, and modification of hardware features as disclosed herein is applicable to a wide variety of devices and components, and are not simply limited to the aforementioned features, or to personal computing devices and components.

Referring back to the embodiment illustrated in FIG. 1, the computing device 104 (as well as computing devices 106-110) may be embodied as any type of computing device capable of performing the functions described herein. For example, a computing device may be embodied as, but is not limited to, a computer, a desktop computer, a personal computer (PC), a tablet computer, a laptop computer, a notebook computer, a server computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic cloud software and related applications. Computing devices 2-n (106-110) are similarly configured to the arrangement illustrated in computing device 104.

In the illustrative embodiment of FIG. 1, the computing device 104 includes processor 120, I/O subsystem 122, memory 124, data storage 126, and communication circuitry 130, which may comprise a network interface controller (NIC) along with any number of devices and circuitry for enabling communications between computing device 104 and one or more other external electronic devices and/or systems. Processor 120 may be embodied as any type of processor currently known or developed in the future and capable of performing the functions described herein. For example, processor 120 may be embodied as a single or multi-core processor(s), digital signal processor, microcontroller, or other processor or processing/controlling circuit. Similarly, memory 124 may be embodied as any type or number of volatile or non-volatile memory or data storage currently known or developed in the future and capable of performing the functions described herein. In operation, memory 124 may store various data and software used during operation of computing device 104 such as operating systems, applications, programs, libraries, and drivers. In some embodiments, the memory 124 and/or data storage 126 has stored therein one or more application programs, and the processor 120 is operable to execute the one or more application programs and control a display screen to display corresponding graphical information thereon. Of course, computing device 104 may include other or additional components, such as those commonly found in a digital apparatus and/or computer (e.g., various input/output devices), in other embodiments.

In the illustrative embodiment, the memory 124 is communicatively coupled to the processor 120 via one or more communication links (i.e., point-to-point links, bus links, wires, cables, light guides, printed circuit board traces, etc.). The memory 124 may also be communicatively coupled to the processor 120 via the I/O subsystem 122, which may be embodied as circuitry and/or components to facilitate input/output operations with the processor 120, the memory 124, and other components of computing device 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SoC) and be incorporated, along with processor 120, memory 124, and other components of computing device 104, on a single integrated circuit chip.

The communications circuitry 130 of the computing device 104 may be embodied as any type of communication circuit, device, or collection thereof, capable of enabling communications between the computing device 104 and other computing devices via one or more communication networks (e.g., local area networks, personal area networks, wide area networks, cellular networks, a global network such as the Internet, etc.). The communications circuitry 130 may be configured to use any one or more communication technologies (e.g., wireless or wired communications) and associated protocols (e.g., Ethernet, Wi-Fi®, WiMAX, etc.) to effect such communication. The communications circuitry 130 may include or be otherwise communicatively coupled to a port or communication interface. The port may be configured to communicatively couple the subscription server 114 to any number of other computing devices and/or networks (e.g., physical or logical networks).

The peripheral devices 128 may include a display, along with associated graphics circuitry. Additionally, in some embodiments, the peripheral devices 128 may further or alternatively include a keyboard, a mouse, audio processing circuitry (including, e.g., amplification circuitry and one or more speakers), and/or other input/output devices, interface devices, and/or peripheral devices.

In some embodiments, the system 100 may include subscription server 114 configured to store and/or execute the one or more application programs, and in such embodiments the computing devices 104-110 may operate as thin-client devices. In the illustrative embodiment of FIG. 1, the subscription server 114 includes a processor 150, an I/O subsystem 152, a memory 154, data storage 156, communication circuitry 162, and one or more peripheral devices 158. Components of subscription server 114 may be similar to the corresponding components of the computing device 104, the description of which is applicable to the corresponding components of the subscription server 114 and is not repeated herein for clarity of the description.

Communication circuitry 162 of the subscription server 114 may include any number of devices and circuitry for enabling communications between the subscription server 114 and the computing device 104. In some embodiments, the subscription server 114 may also include one or more peripheral devices 158. Such peripheral devices 158 may include any number of additional input/output devices, interface devices, and/or other peripheral devices commonly associated with a server or computing device.

In the illustrated embodiment, communication between computing devices 104-110 and the subscription server 114 takes place via network 112 that may be operatively coupled to one or more network switches 170. In one embodiment, the network 112 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry 130 of the computing device 104 and the communication circuitry 162 of subscription server 114 may be configured to use any one or more, or combination, of communication protocols to communicate with each other such as, for example, a wired network communication protocol (e.g., TCP/IP), a wireless network communication protocol (e.g., Wi Wi-Fi®, WiMAX), a cellular communication protocol (e.g., Wideband Code Division Multiple Access (W-CDMA)), and/or other communication protocols. As such, the network 112 may include any number of additional devices, such as additional computers, routers, and switches, to facilitate communications between computing device 104 and subscription server 114.

Figure 2:
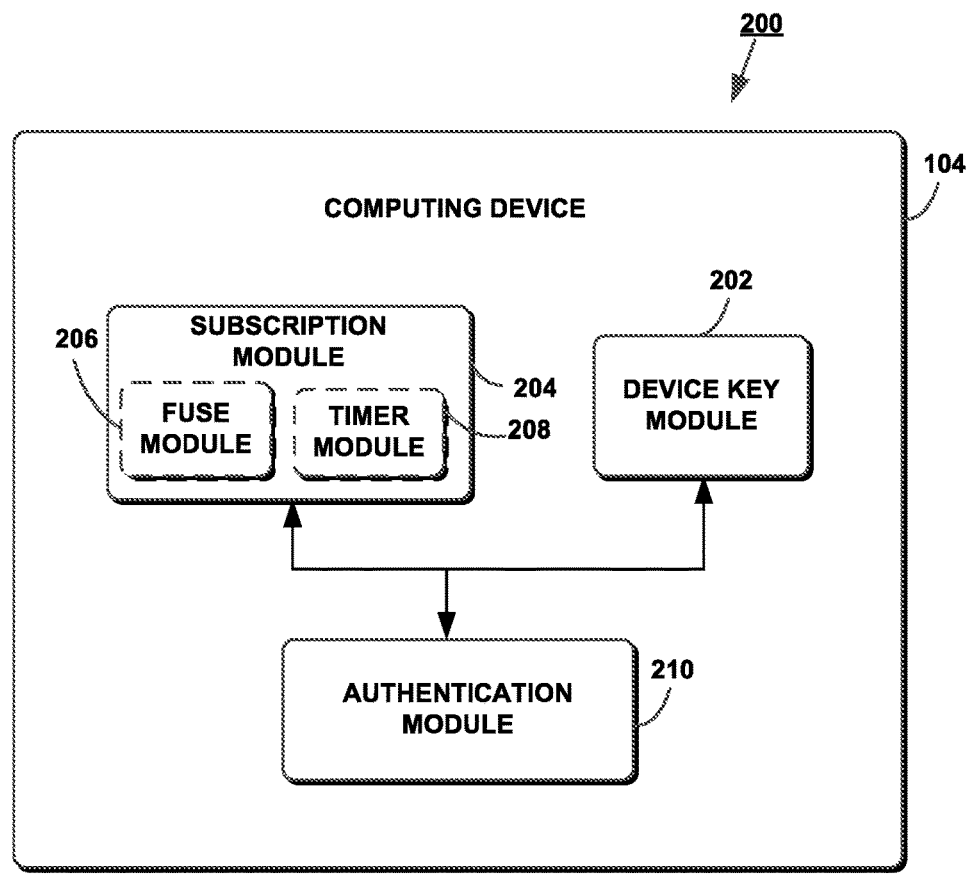
FIG. 2 illustrates a simplified block diagram of at least one embodiment of an environment of a computing device for obtaining hardware subscription services of the system FIG. 1.

Referring now to FIG. 2, in use, the computing device 104 establishes an environment 200 during operation. The illustrative environment 200 includes a device key module 202, which contains a device key for transmission to the subscriber server 114 via communication circuitry 130. In an illustrative embodiment, the device key for module 202 may be a unique device key embedded in a protected memory area of computing device 104 (e.g., memory 124) that uniquely identifies the computing device and provides, among other things, information on the computing device 104 platform, hardware capability, and hardware subscription information. In an illustrative embodiment, the device key for module 202 may be embedded during a manufacturing process. When the computing device 104 communicatively couples to the subscription server 114, the device key module 202 transmits the device key in order to communicate the computing device hardware configuration, so that subscription server may determine hardware subscription options.

In an illustrative embodiment, the environment 200 may also include a subscription module 204 that includes a fuse module 206 and a timer module 208. In some embodiments, the subscription module 204 may be embodied as a SoC comprising hardware subscription features defined by hardware subscription fuses of the fuse module 206. Illustrative SoC configurations for the fuse module 204 include programmable read-only memory (PROM) or field programmable read-only memory (FPROM) or one-time programmable non-volatile memory (OTP NVM), which is a form of digital memory where the setting of each bit is locked by a fuse or antifuse. Such devices are a type of ROM (read-only memory), meaning the data in them is permanent and cannot be changed. The hardware subscription features of the fuse module 206 are used to control the enablement of associated silicon and/or platform subscription features. In some embodiments, the fuse module 206 may be embodied as a silicon fuse, a silicon register program, a platform hardware fuse, a platform hardware register program, etc. For secure enablement of hardware subscription features, the hardware subscription fuses are programmed in a pre-boot environment using an authenticated module, such as a UEFI module.

The subscription module 204 may also utilize the timer module 208 within the silicon to enable a periodic hardware subscription model. In use, the timer module 208 may keep track of subscription time by loading a count in pre-boot, wherein the count may be modified only by an authenticated module. The count may be persistent, meaning the count may continue even when power is turned off. Once loaded with a count, the timer module 208 decrements the subscription time while the system is running, and any periodic hardware subscriptions will be available until the count expires. In other illustrative embodiments, subscription module 204 is embodied as software emulating the functions and features of fuse model 206 and timer module 208.

The illustrative environment 200 of FIG. 2 further comprises an authentication module 210 to authenticate boot (e.g., UEFI) capsules received from subscription server 114. The authentication module 210 may be embodied as, for example, a cryptographic service exchange (CSE) authentication module. An illustrative boot capsule contains a capsule header and a capsule volume. The capsule header is a part of the capsule that is used by an OS-present application, and may contain information such as informative text comprising information that allows the OS-present application to describe the contents of the capsule to the end user. The text may be in Unicode and can support several different languages. The boot capsule may further contain original equipment manufacturer (OEM)-specific information as well. A capsule volume may have the same basic structure as a standard firmware volume. Capsule volumes, however, have more predictably defined formats than the more highly extensible firmware volume format, and may include a firmware volume file containing a firmware volume image section, and a configuration results file. The configuration results file may be is written by an OS-present application and provides the results from the setup program. Flags in the capsule header indicate support for this file by the capsule.

The authentication module 210 is configured in the illustrative embodiment to authenticate a payload of a boot capsule (e.g., UEFI capsule) received from subscription server 114 during boot (e.g., reboot 416 of FIG. 5, discussed below). The authentication module 210 may be bi-directionally coupled with the cryptographic service engine module 305 of subscription server 114 which is configured to provide requested cryptographic services for authenticating boot capsules. Cryptographic services may include, but are not limited to, encryption and decryption (e.g. symmetric block ciphers, generic cipher modes, stream cipher modes, public-key cryptography, padding schemes for public-key systems, key agreement schemes, elliptic curve cryptography, one-way hash functions, message authentication codes, cipher constructions based on hash functions, pseudo random number generators, password based key derivation functions, etc.), hashing operations (e.g. SHA-1, HMAC, etc.), and signing and verification operations such as RSA and DSA. When a boot capsule is received with a secured payload from subscription server 114, the authentication module 210 processes the secured payload to authorize the boot capsule for computing device 104. Once authorized, payload deployment is performed in a CSE secure storage so that the boot capsule may be used at every boot.

The boot capsule may be installed by subscription module 204 on computing device 104 using a boot capsule update mechanism (e.g., UEFI update mechanism), where, under an illustrative embodiment, a special boot path is created in which a capsule can be loaded into the system memory at OS runtime and then executed following a processor initialization or warm reset. Instead of programming firmware, a boot driver in the capsule (e.g., a driver execution environment (DXE) driver that is responsible for manipulating capsules) provides the boot capsule containing the hardware feature subscription to the authentication module 210 for authentication in a pre-boot environment. The authentication module 210 authenticates the boot capsule, along with the device key, and saves information on a subscription period, fuse sampling, and/or secure agent infrastructure (SAI) communication needed at reset in secure storage that is accessible to the authentication module 210 only. The result is communicated back to subscription server 114 using a boot mechanism (e.g., UEFI boot mechanism) to report the update status. In an illustrative embodiment, the user of computing device 104 may be prompted with appropriate status of the transaction to provide an "App Store"-like experience. Upon each power-up, before executing a host processor reset, the authentication module 210 checks for enabled hardware subscription features in secure storage and emulates fuses at reset or SAI communication to the target silicon, so that the target silicon can start with the enabled hardware subscription features right from platform reset. This mechanism allows for the enabling and disabling of hardware subscription features as indicated by the hardware subscription module 204 to implement try-out periods, periodic subscriptions and return or recovery policies.

It is noted that, in some embodiments, device key module 202 may be able to provide enough information from the unique device key alone to subscription server 114 to allow hardware subscription services to be provided to computing device 104. In such a case, use of the fuse module 206 and the timer module 208 may be optional. In some illustrative embodiments, device key module 202 may be integrated with the subscription module 204. Furthermore, the various modules of the environment 200 may be embodied as hardware, firmware, software, or a combination thereof. For example the various modules, logic, and other components of the environment 200 may form a portion of, or otherwise be established by, the processor 120 or other hardware components of the computing device 104. For example, in some embodiments, one or more of the modules of the environment 200 may be embodied as a circuit (e.g., authentication module, etc.).

Figure 3:
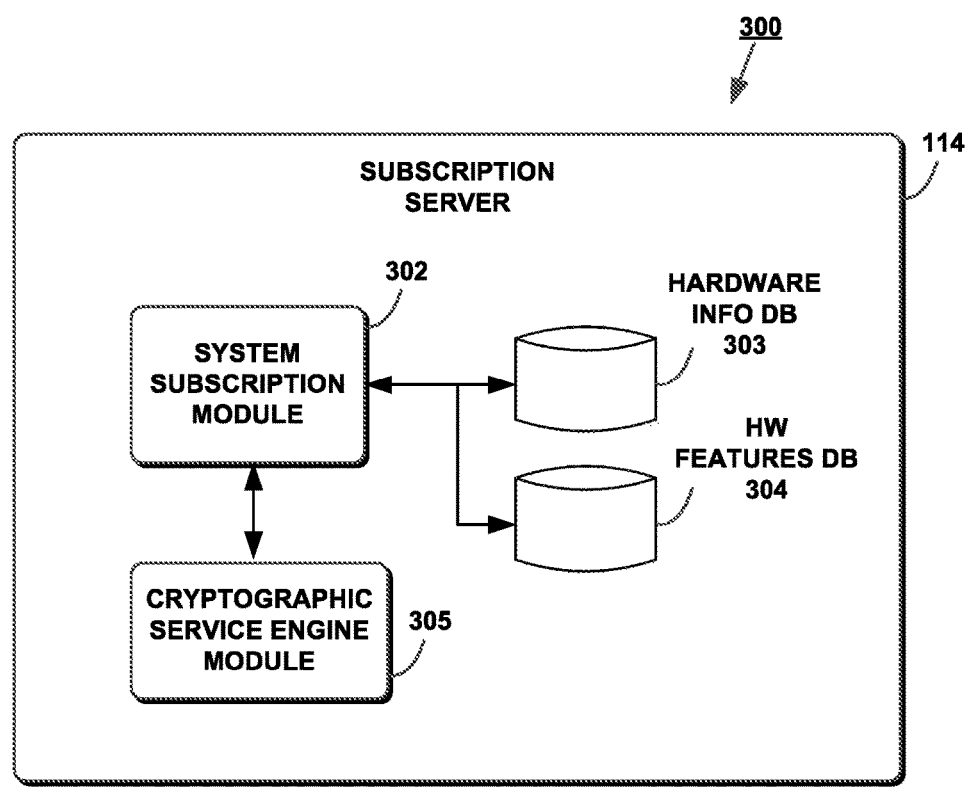
FIG. 3 illustrates a simplified block diagram of at least one embodiment of an environment of a subscription server for securely providing hardware subscription services for one or more computing devices of the system FIG. 1.

Referring now to FIG. 3, in use, the subscription server 114 establishes an environment 300 during operation. The illustrative environment 300 includes a system subscription module 302 that is responsible for managing, distributing, and authorizing hardware subscriptions to any of the computing devices 104-110. When the subscription server 114 receives computing device hardware configuration data (e.g., via a device key), the subscription server 114 looks up the hardware configuration data in the hardware information database 303 to determine the exact computing device platform information, hardware capability and subscription information. Once determined, the subscription module 302 obtains hardware subscription options from hardware features database 304. Once the hardware subscription options are assembled, they may be presented to a user via an interface, similar to that of an "App Store" or the like, or communicated directly to a computing device 104.

Once the user of a computing device 104 selects and/or purchases one or more hardware subscription options, the system subscription module 302 generates a boot (e.g., UEFI) hardware subscription capsule to function as hardware subscription authorization for each of the selected/purchased features and transmits each capsule together with a build payload provided from the cryptographic service engine module 305, securing the capsule for installation at the computing device 104 to enable and/or modify hardware features. It is noted that the various modules of the environment 300 may be embodied as hardware, firmware, software, or a combination thereof. For example the various modules, logic, and other components of the environment 300 may form a portion of, or otherwise be established by, the processor 150 or other hardware components of the subscription server 114. For example, in some embodiments, one or more of the modules of the environment 300 may be embodied as a circuit (e.g., system subscription module, etc.).

Figure 4:
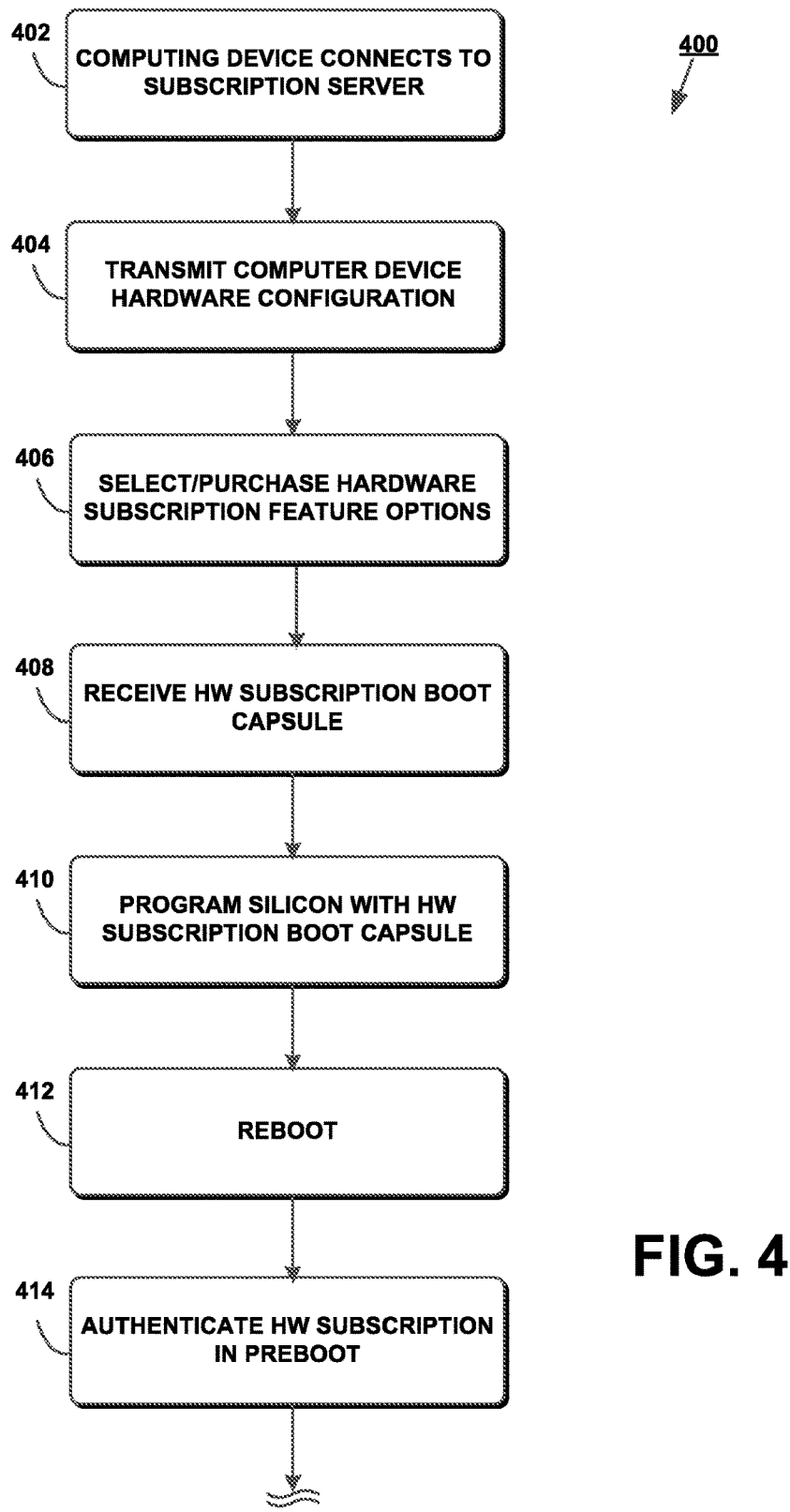
FIG. 4 is a simplified flow diagram of at least one embodiment of a method for receiving and processing a hardware subscription capsule at a computing device to authenticate and enable hardware subscription features.

Referring now to FIG. 4, the computing device 104 may execute a method 400 for authenticating and enabling hardware subscription features during operation. The method 400 begins with block 402 in which the computing device 104 connects to the subscription server 402 over the network 112. Once connected, the computer node 104 transmits a computing device 104 hardware configuration in block 404. As discussed above, the computing device 104 hardware configuration may be provided by a device key or from data provided by fuse module 206 of subscription module 204. Once the hardware configuration is processed by the subscription server 114 and hardware subscription options are presented to a user, the user may select/purchase hardware subscription feature options in block 406. Next, the computing device 104 receives a boot subscription capsule in block 408, wherein the boot subscription capsule is used as hardware subscription authorization to program silicon in computing device 104 in block 410. Once programmed, the computing device 104 reboots in block 412, at which point the authentication module 210 authenticates the hardware subscription in pre-boot in block 414.

Figure 5:
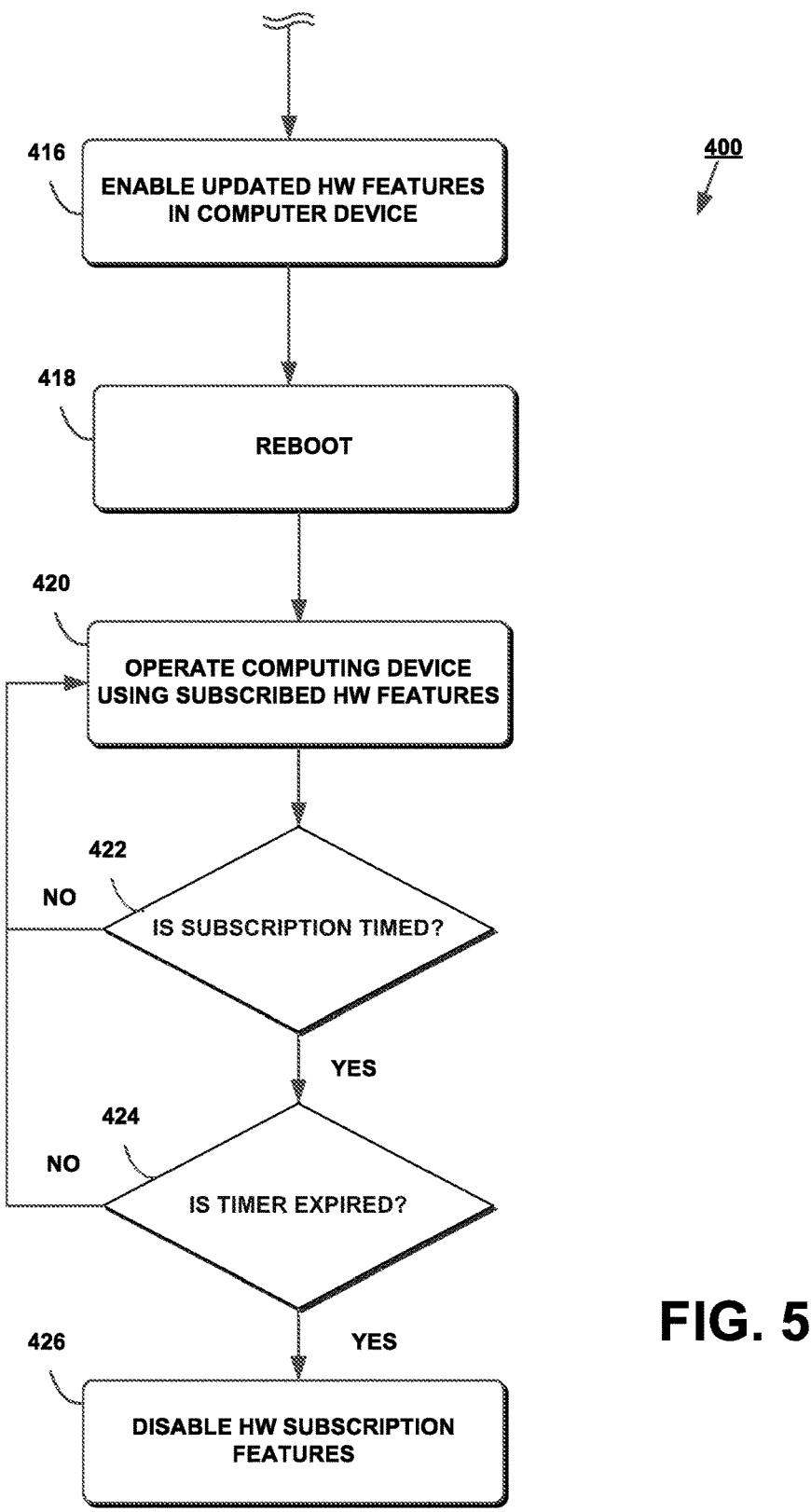
FIG. 5 is a simplified flow diagram of at least one embodiment of a method for operating and disabling hardware subscription features in a computing device.

Referring now to FIG. 5, the computing device 104 continues to execute the method 400, where, after authentication, the hardware feature subscription is enabled in the computing device 102 in block 416, and the computing device 104 reboots again in block 418, at which point the computing device 104 is able to operate using the subscribed hardware features in block 420. In some embodiments, the authentication module 210 may transmit enabled and/or operational hardware subscription features on each reboot. In some embodiments, hardware subscription features may be based on a time-limited subscription. In decision block 422, a determination is made if the subscription is time-limited. If it is not ("NO"), the hardware subscription feature continues to operate on computing device 104 in block 420. If the hardware subscription features are time based ("YES"), decision block 424 determines if a timer associated with the hardware subscription feature has expired. If the timer has not expired ("NO"), the hardware subscription feature continues to operate on computing device 104 in block 420. If the timer has expired ("YES"), the hardware subscription feature is disabled in block 426. Once disabled, the computing device 104 may be required to re-select/repurchase the disabled feature in block 406 and proceed with authenticating and enabling a new boot capsule to get the hardware subscription feature back.

Figure 6:
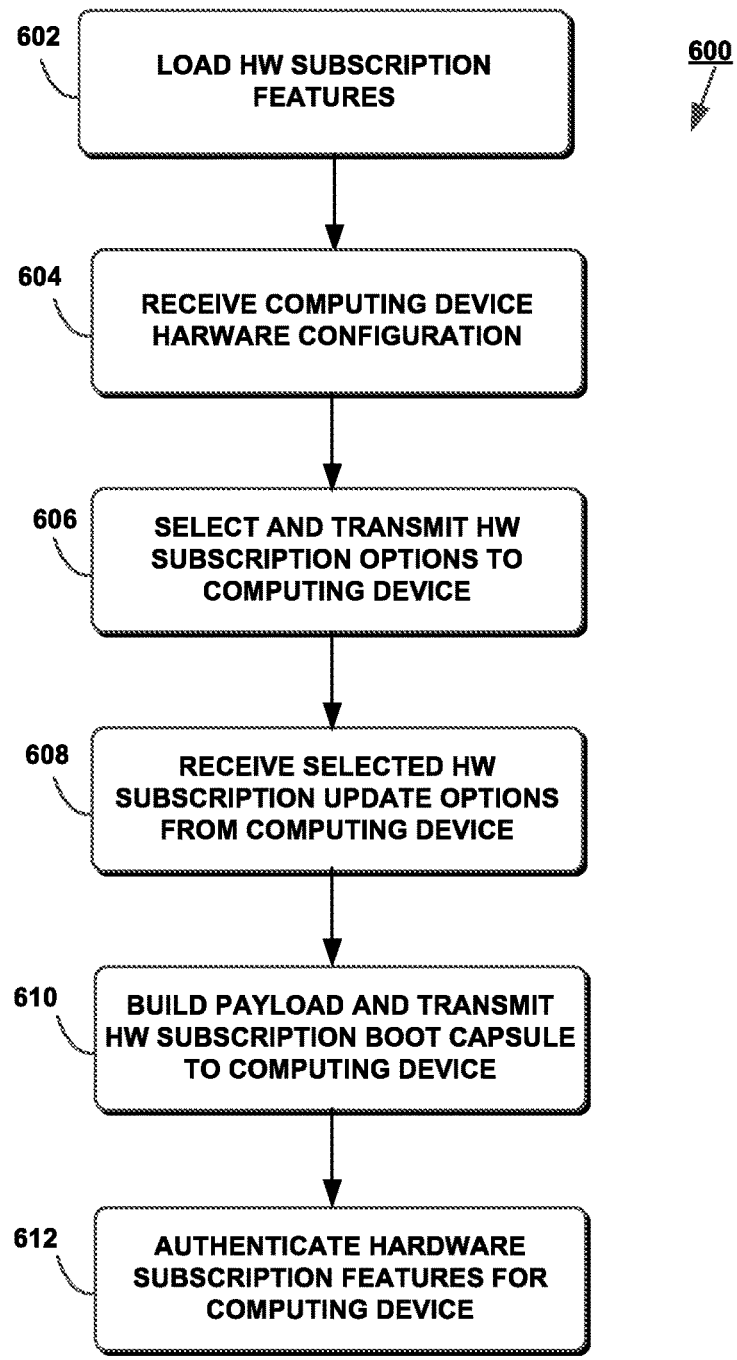
FIG. 6 is a simplified flow diagram of at least one embodiment of a method for establishing hardware subscription options at a subscription server and providing a hardware subscription capsule to a computing device to enable hardware subscription features.

Referring now to FIG. 6, the subscription server 114 may execute a method 600 for providing and authenticating hardware subscription features for the computer node 104. The method 600 begins with block 602 in which the subscription server 602 loads available hardware subscription features in the hardware features database 304 in block 602. The subscription server 114 receives a computing device 104 hardware configuration (e.g., via a device key) in block 604. Based on the received hardware configuration, the subscription server 114 selects and transmits hardware subscription options to the computing device 104 in block 606. After the computing device 104 selects/purchases one or more hardware subscription options, the subscription server 114 receives the selected hardware subscription options from the computing device 104 in block 608. Based on the selection, the subscription server builds a payload (e.g., using cryptographic service engine module 305) and transmits a boot hardware subscription capsule serving as hardware subscription authorization to computing device 104 in block 610. Depending on the type of authentication used, subscription server 114 may authenticate a hardware subscription feature (e.g., in block 414 of FIG. 4) for computing device 104 in block 612.

Figure 7:
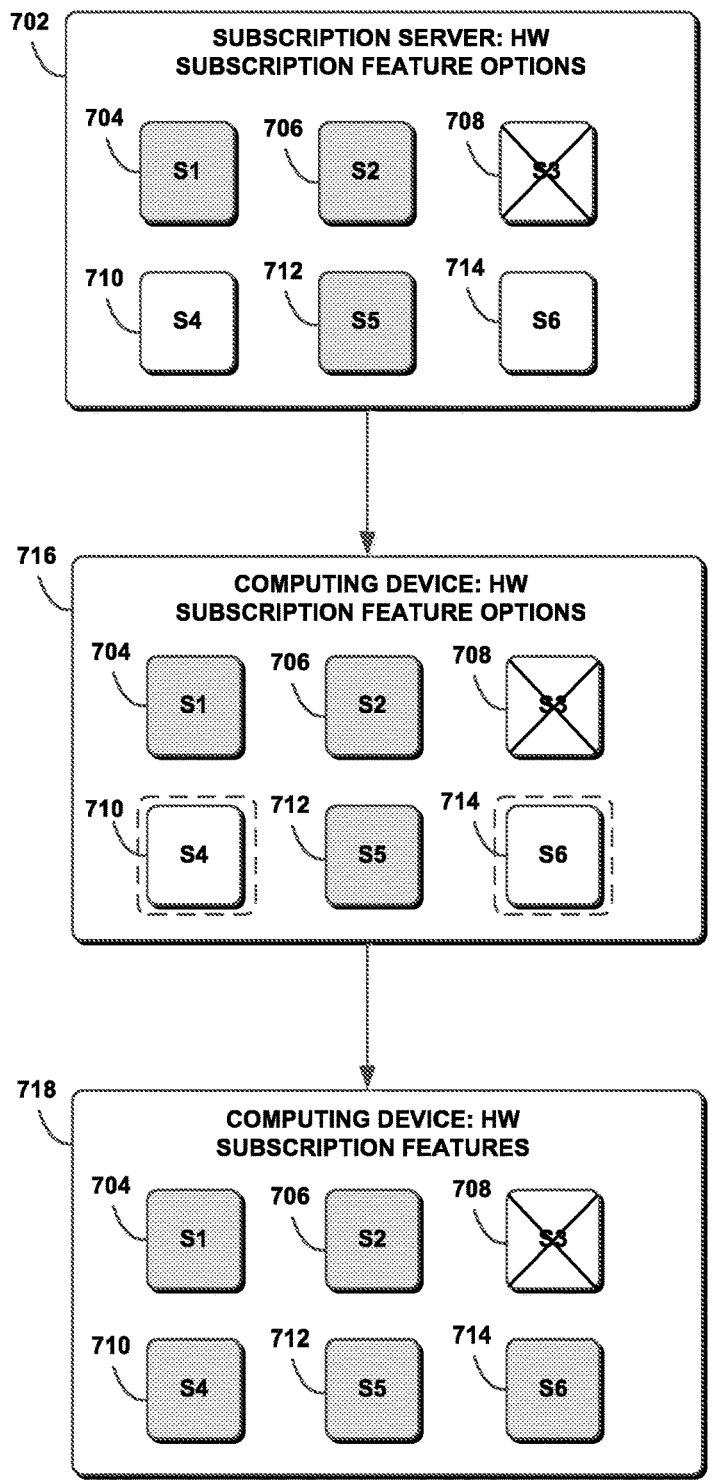
FIG. 7 is a simplified illustration of at least one embodiment of a hardware subscription selection process between a subscription server and a computing device of the system FIG. 1.

Referring now to FIG. 7, a simplified illustration is provided of at least one embodiment of a hardware subscription selection process between the subscription server 114 and the computing device 104. After receiving hardware configuration data from computer device 104, the subscription server 114 determines hardware subscription feature options 702, resulting in hardware subscription feature options S1-S6 (704-714). As can be seen in the figure, the hardware subscription feature options S1 (704), S2 (706) and S5 (712) are already enabled on the computing device 104 (shown as shaded in the figure), while the hardware subscription feature options S4 (710) and S6 (714) are not enabled, but are available for selection/purchase. The hardware subscription feature option S3 (708) is shown in the embodiment as not available for selection/purchase. The hardware subscription feature options are presented in 714 to the computing device 104, wherein the user selects hardware subscription feature options S4 (710) and S6 (714). Once selected, the method steps described above in connection with FIGS. 4-6 are performed to provide hardware subscription features 718, wherein selected hardware feature options S4 (710) and S6 (714) are now enabled and operative, together with previously-enabled features S1 (704), S2 (706) and S5 (712).

EXAMPLES

Illustrative examples of the technologies disclosed herein are provided below. An embodiment of the technologies may include any one or more, and any combination of, the examples described below.

Example 1 includes a computing device for subscription-based usage of a hardware component on the computing device comprising a subscription module to transmit a device key to a network, wherein the device key comprises hardware configuration data for the computing device and wherein the subscription module receives a hardware subscription authorization in response to the transmitted device key, wherein the hardware subscription authorization comprises a boot capsule usable by the computing device to enable or modify operation of the hardware component of the computing device; and an authentication module communicatively coupled to the subscription module to authenticate the boot capsule, wherein the subscription module installs the authenticated boot capsule in a secure memory of the computing device to authorize use of the hardware component defined by the hardware subscription authorization data.

Example 2 includes the subject matter of claim 1, and wherein the boot capsule comprises a Unified Extensible Firmware Interface (UEFI) capsule.

Example 3 includes the subject matter of any of Examples 1 and 2, and wherein the subscription module is to reboot the computing device using a boot path specified by the UEFI capsule.

Example 4 includes the subject matter of any of Examples 1-3, and wherein a UEFI driver of the UEFI capsule is to provide the UEFI capsule to the authentication module to authenticate the UEFI capsule in a pre-boot environment.

Example 5 includes the subject matter of any of Examples 1-4, and wherein the authentication module is to save the hardware subscription authorization in the secure memory and authenticates the saved hardware subscription authorization for each use of the hardware component.

Example 6 includes the subject matter of any of Examples 1-5, and wherein the hardware configuration authorization comprises at least one of computing device platform information, hardware component capability and subscription information.

Example 7 includes the subject matter of any of Examples 1-6, and wherein the hardware component comprises a silicon-based component.

Example 8 includes the subject matter of any of Examples 1-7, and wherein the hardware component comprises one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interfaces to allow connections to external peripherals.

Example 9 includes the subject matter of any of Examples 1-8, and wherein the hardware subscription authorization comprises time data for limiting a time during which authorized use of the hardware component defined by the hardware subscription signal authorization is permitted.

Example 10 includes the subject matter of any of Examples 1-9, and wherein the subscription module is to disable authorized use of the hardware component defined by the hardware subscription authorization once the time data expires.

Example 11 includes the subject matter of any of Examples 1-10, and wherein the computing device is to select the hardware component for prior to receipt of the hardware subscription authorization for the hardware component.

Example 12 includes a subscription server for subscription-based usage of a hardware component on a computing device comprising a system subscription module to receive a device key from a network, wherein the device key comprises hardware configuration data for the computing device and wherein the system subscription module transmits a hardware subscription authorization based on the received device key, wherein the hardware subscription authorization comprises a boot capsule to enable or modify operation of the hardware component of the computing device; and a cryptographic service engine module to provide a secure payload to transmit with the hardware subscription authorization, wherein the cryptographic service engine authorizes installation of the boot capsule by the computing device.

Example 13 includes the subject matter of Example 12, and wherein the hardware configuration data comprises at least one of computing device platform information, hardware component capability and subscription information.

Example 14 includes the subject matter of any of Examples 12 and 13, and wherein the system subscription module is to determine one or more hardware component options for the hardware subscription authorization based on the hardware configuration data.

Example 15 includes the subject matter of any of Examples 12-14, and wherein the system subscription module is to communicate the one or more hardware component options to the computing device, and receives a selection of the one or more hardware component options from the computing device.

Example 16 includes the subject matter of any of Examples 12-15, and wherein the system subscription module is to transmit the hardware subscription authorization based on the selected hardware component option.

Example 17 includes the subject matter of any of Examples 12-16, and wherein the boot capsule comprises a Unified Extensible Firmware Interface (UEFI) capsule.

Example 18 includes the subject matter of any of Examples 12-17, and wherein the UEFI capsule specifies a boot path for the computing device.

Example 19 includes the subject matter of any of Examples 12-18, and wherein the UEFI capsule comprises a UEFI driver to authenticate the UEFI capsule in a pre-boot environment.

Example 20 includes the subject matter of any of Examples 12-19, and wherein the hardware component comprises a silicon-based component.

Example 21 includes the subject matter of any of Examples 12-20, and wherein the hardware component comprises one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interfaces to allow connections to external peripherals.

Example 22 includes the subject matter of any of Examples 12-21, and wherein the hardware subscription authorization comprises time data for limiting a time during which authorized use of the hardware component defined by the hardware subscription authorization data is permitted.

Example 23 includes the subject matter of any of Examples 12-22, and wherein the authorized use of the hardware component defined by the hardware subscription authorization is disabled once the time data expires.

Example 24 includes a method for subscription-based usage of a hardware component on a computing device comprising transmitting, by a subscription module, a device key to a network, wherein the device key comprises hardware configuration data for the computing device; receiving, by the subscription module, a hardware subscription authorization in response to the transmitted device key, wherein the hardware subscription authorization comprises a boot capsule usable by the computing device to enable or modify operation of the hardware component of the computing device; authenticating, by an authentication module, the boot capsule; and installing, by the subscription module, the authenticated boot capsule in a secure memory of the computing device to authorize use of the hardware component defined by the hardware subscription authorization data.

Example 25 includes the subject matter of Example 24, and wherein receiving the hardware subscription authorization comprises receiving the boot capsule comprising a Unified Extensible Firmware Interface (UEFI) capsule.

Example 26 includes the subject matter of any of Examples 24 and 25, and further comprising rebooting, by the subscription module, the computing device using a boot path specified by the UEFI capsule.

Example 27 includes the subject matter of any of Examples 24-26, and further comprising providing, by a UEFI driver of the UEFI capsule, the UEFI capsule to the authentication module to authenticate the UEFI capsule in a pre-boot environment.

Example 28 includes the subject matter of any of Examples 24-27, and further comprising saving, by the authentication module, the hardware subscription authorization in the secure memory and authenticates the saved hardware subscription authorization for each use of the hardware component.

Example 29 includes the subject matter of any of Examples 24-28, and wherein transmitting the device key comprises transmitting hardware configuration data comprising at least one of computing device platform information, hardware component capability and subscription information.

Example 30 includes the subject matter of any of Examples 24-29, and wherein receiving the hardware subscription authorization to enable or modify operation of the hardware component comprises data to enable or modify operation of a silicon-based component.

Example 31 includes the subject matter of any of Examples 24-30, and wherein receiving the hardware subscription authorization to enable or modify operation of the hardware component comprises data to enable or modify operation of at least one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interfaces to allow connections to external peripherals.

Example 32 includes the subject matter of any of Examples 24-31, and wherein receiving the hardware subscription authorization comprising data to enable or modify operation of the hardware component comprises receiving time data for limiting a time during which authorized use of the hardware component defined by the hardware subscription signal authorization is permitted.

Example 33 includes the subject matter of any of Examples 24-32, and further comprising disabling, by the subscription module, authorized use of the hardware component defined by the hardware subscription authorization once the time data expires.

Example 34 includes the subject matter of any of Examples 24-33, and further comprising receiving a selection signal from the computing device that selects the hardware subscription authorization prior to receipt.

Example 35 includes a method for providing subscription-based usage by a subscription server of a hardware component on a computing device comprising receiving, by a system subscription module, a device key from a network, wherein the device key comprises hardware configuration data for the computing device; transmitting, by the system subscription module, a hardware subscription authorization based on the received device key, wherein the hardware subscription authorization comprises a boot capsule to enable or modify operation of the hardware component of the computing device; and providing, by a cryptographic service engine module, a secure payload to transmit with the hardware subscription authorization, wherein the cryptographic service engine authorizes installation of the boot capsule by the computing device.

Example 36 includes the subject matter of Example 35, and further comprising receiving the device key from the network comprises receiving hardware configuration data comprising at least one of computing device platform information, hardware component capability and subscription information.

Example 37 includes the subject matter of any of Examples 35 and 36, and further comprising determining, by the system subscription module, one or more hardware component options for the hardware subscription authorization based on the hardware configuration data.

Example 38 includes the subject matter of any of Examples 34-37, and further comprising communicating, by the system subscription module, the one or more hardware component options to the computing device, and receives a selection of the one or more hardware component options from the computing device.

Example 39 includes the subject matter of any of Examples 34-38, and further comprising transmitting, by the system subscription module, the hardware subscription authorization based on the selected hardware component option.

Example 40 includes the subject matter of any of Examples 34-39, and wherein transmitting the hardware subscription authorization comprises transmitting the boot capsule comprising a Unified Extensible Firmware Interface (UEFI) capsule.

Example 41 includes the subject matter of any of Examples 34-40, and wherein transmitting the boot capsule comprising a UEFI capsule comprises transmitting the UEFI capsule specifying a boot path for the computing device.

Example 42 includes the subject matter of any of Examples 34-41, and wherein transmitting the UEFI capsule comprises transmitting the UEFI capsule comprising a UEFI driver to authenticate the UEFI capsule in a pre-boot environment.

Example 42 includes the subject matter of any of Examples 34-42, and wherein transmitting the hardware subscription authorization to enable or modify operation of the hardware component comprises data to enable or modify operation of the hardware component comprises data to enable or modify operation of the hardware component comprising a silicon-based component.

Example 43 includes the subject matter of any of Examples 34-43, and wherein transmitting the hardware subscription authorization to enable or modify operation of the hardware component comprises data to enable or modify operation of at least one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interfaces to allow connections to external peripherals.

Example 45 includes the subject matter of any of Examples 34-43, and wherein transmitting the hardware subscription authorization comprises transmitting time data for limiting a time during which authorized use of the hardware component defined by the hardware subscription authorization data is permitted.

Example 46 includes the subject matter of any of Examples 34-45, and further comprising disabling, by the system subscription module, authorized use of the hardware component defined by the hardware subscription authorization once the time data expires.

Example 47 includes one or more machine-readable media comprising a plurality of instructions stored thereon that, in response to execution by a computing device, causes the computing device to perform the method of any of Examples 24-46.

Example 48 includes a computing device for updating firmware of a networking device of the computing device, the computing device comprising means for performing the method of any of Examples 24-46.

The invention claimed is:

1. A computing device for subscription-based usage of a hardware component on the computing device comprising: a processor having a subscription module and an authentication module; and a memory to use in connection with the processor, wherein:
the subscription module to transmit a device key to a network, wherein the device key comprises hardware configuration data that identifies hardware components of the computing device and wherein the subscription module receives a hardware subscription authorization in response to the transmitted device key, wherein the hardware subscription authorization comprises a boot capsule usable by the computing device to enable or modify operation of the hardware component of the computing device, wherein to enable or modify operation of the hardware component comprises to program a hardware subscription fuse in the computing device that corresponds to the hardware component; and
the authentication module communicatively coupled to the subscription module to authenticate the boot capsule,
wherein the subscription module is further to install the authenticated boot capsule in a secure memory of the subscription module to authorize use of the hardware component defined by the hardware subscription authorization data, wherein the secure memory is inaccessible to a host processor of the computing device.

2. The computing device of claim 1, wherein the boot capsule comprises a Unified Extensible Firmware Interface (UEFI) capsule.

3. The computing device of claim 1, wherein the subscription module is to reboot the computing device using a boot path specified by the UEFI capsule.

4. The computing device of claim 3, wherein a UEFI driver of the UEFI capsule is to provide the UEFI capsule to the authentication module to authenticate the UEFI capsule in a pre-boot environment.

5. The computing device of claim 1, wherein the authentication module is to save the hardware subscription authorization in the secure memory and authenticate the saved hardware subscription authorization for each use of the hardware component.

6. The computing device of claim 1, wherein the hardware configuration authorization comprises at least one of computing device platform information, hardware component capability and subscription information.

7. The computing device of claim 1, wherein the hardware component comprises one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interface to allow connections to external peripherals.

8. The computing device of claim 1, wherein the hardware subscription authorization comprises time data for limiting a time during which authorized use of the hardware component defined by the hardware subscription signal authorization is permitted.

9. A subscription server for subscription-based usage of a hardware component on a computing device comprising: a processor having a system subscription module, and a cryptographic service engine module; and a memory to use in connection with the processor, wherein:

the system subscription module to receive a device key from a network, wherein the device key comprises hardware configuration data that identifies hardware components of the computing device and wherein the system subscription module transmits a hardware subscription authorization based on the received device key, wherein the hardware subscription authorization comprises a boot capsule to enable or modify operation of the hardware component of the computing device, wherein to enable or modify operation of the hardware component comprises to program a hardware subscription fuse in the computing device that corresponds to the hardware component; and the cryptographic service engine module to provide a secure payload to transmit with the hardware subscription authorization, wherein the cryptographic service engine authorizes installation of the boot capsule by the computing device.

10. The subscription server of claim 9, wherein the hardware configuration data comprises at least one of computing device platform information, hardware component capability and subscription information.

11. The subscription server of claim 10, wherein the system subscription module is to determine one or more hardware component options for the hardware subscription authorization based on the hardware configuration data.

12. The subscription server of claim 11, wherein the system subscription module is to communicate the one or more hardware component options to the computing device, and receive a selection of the one or more hardware component options from the computing device.

13. The subscription server of claim 12, wherein the system subscription module is to transmit the hardware subscription authorization based on the selected hardware component option.

14. The subscriptions server of claim 10, wherein the boot capsule comprises a Unified Extensible Firmware Interface (UEFI) capsule.

15. The subscription server of claim 14, wherein the UEFI capsule specifies a boot path for the computing device.

16. The subscription server of claim 15, wherein the UEFI capsule comprises a UEFI driver to authenticate the UEFI capsule in a pre-boot environment.

17. The subscription server of claim 9, wherein the hardware component comprises one of (i) a processor that comprises a plurality of processor cores used during operation (ii) a processor with a modifiable processor operating frequency, (ii) a modifiable cache size memory, (iii) a PCI Express Graphics (PEG) port having modifiable lanes, (iv) a gesture sensing apparatus, (v) a fingerprint sensing apparatus or (vi) a hardware interface to allow connections to external peripherals.

18. One or more non-transitory computer-readable storage media for subscription-based usage of a hardware component on a computing device, the computer-readable storage media comprising a plurality of instructions stored thereon that in response to being executed by a hardware processor cause a computing device to:

transmitting, by a subscription module, a device key to a network, wherein the device key comprises hardware configuration data for the computing device that identifies hardware components of the computing device;

receiving, by the subscription module, a hardware subscription authorization in response to the transmitted device key, wherein the hardware subscription authorization comprises a boot capsule usable by the computing device to enable or modify operation of the hardware component of the computing device, wherein to enable or modify operation of the hardware component comprises to program a hardware subscription fuse in the computing device that corresponds to the hardware component;

authenticating, by an authentication module, the boot capsule; and installing, by the subscription module, the authenticated boot capsule in a secure memory of the subscription module to authorize use of the hardware component defined by the hardware subscription authorization data, wherein the secure memory is inaccessible to a host processor of the computing device.

19. The non-transitory computer-readable storage media of claim 18, wherein receiving the hardware subscription authorization comprises receiving the boot capsule comprising a Unified Extensible Firmware Interface (UEFI) capsule.

20. The non-transitory computer-readable storage media of claim 19, further comprising rebooting, by the subscription module, the computing device using a boot path specified by the UEFI capsule.

21. The non-transitory computer-readable storage media of claim 20, further comprising providing, by a UEFI driver of the UEFI capsule, the UEFI capsule to the authentication module to authenticate the UEFI capsule in a pre-boot environment.

22. One or more non-transitory computer-readable storage media for providing subscription-based usage of a hardware component by a subscription server, the computer-readable storage media comprising a plurality of instructions stored thereon that in response to being executed by a hardware processor cause a computing device to:

receiving, by a system subscription module, a device key from a network, wherein the device key comprises hardware configuration data that identifies hardware components of the computing device;

transmitting, by the system subscription module, a hardware subscription authorization based on the received device key, wherein the hardware subscription authorization comprises a boot capsule to enable or modify operation of the hardware component of the computing device by programming a hardware subscription fuse in the computing device that corresponds to the hardware component; and providing, by a cryptographic service engine module, a secure payload to transmit with the hardware subscription authorization, wherein the cryptographic service engine authorizes installation of the boot capsule by the computing device.

23. The non-transitory computer-readable storage media of claim 22, wherein receiving the device key from the network comprises receiving hardware configuration data comprising at least one of computing device platform information, hardware component capability and subscription information.

24. The non-transitory computer-readable storage media of claim 22, wherein transmitting the hardware subscription authorization comprises transmitting the boot capsule comprising a Unified Extensible Firmware Interface (UEFI) capsule.

\* \* \* \* \*